United States Patent
Naegel et al.

(10) Patent No.: US 11,015,731 B2
(45) Date of Patent: May 25, 2021

(54) VALVE, MORE PARTICULARLY A PUMP VALVE, FOR DELIVERING ABRASIVE AND/OR HETEROGENEOUS MIXTURES

(71) Applicant: Feluwa Pumpen GmbH, Muerlenbach (DE)

(72) Inventors: Daniel Naegel, Daun (DE); Rudolf Gaensl, Eisenberg (DE); Eberhard Schluecker, Obersulm (DE)

(73) Assignee: Feluwa Pumpen GmbH, Muerlenbach (DE)

( * ) Notice: Subject to any disclaimer, the term of this patent is extended or adjusted under 35 U.S.C. 154(b) by 178 days.

(21) Appl. No.: 16/324,669

(22) PCT Filed: Aug. 7, 2017

(86) PCT No.: PCT/DE2017/100667
§ 371 (c)(1),
(2) Date: Feb. 11, 2019

(87) PCT Pub. No.: WO2018/028749
PCT Pub. Date: Feb. 15, 2018

(65) Prior Publication Data
US 2019/0178408 A1 Jun. 13, 2019

(30) Foreign Application Priority Data

Aug. 12, 2016 (DE) ............... 10 2016 115 025.8

(51) Int. Cl.
*F16K 31/06* (2006.01)
*F04B 53/10* (2006.01)
(Continued)

(52) U.S. Cl.
CPC .......... *F16K 31/0655* (2013.01); *F04B 53/10* (2013.01); *F04B 53/1022* (2013.01);
(Continued)

(58) Field of Classification Search
CPC ...... F16K 31/0655; F16K 15/06; F16K 15/00; F04B 53/1022; F04B 53/1027; F04B 53/10
(Continued)

(56) References Cited

U.S. PATENT DOCUMENTS

| 2,355,862 | A | | 8/1944 | Harper | |
|---|---|---|---|---|---|
| 3,336,942 | A | * | 8/1967 | Keith | F16K 15/026 137/529 |
| 5,374,029 | A | | 12/1994 | Bailey | |

FOREIGN PATENT DOCUMENTS

| DE | 12 16 847 A | 5/1966 |
|---|---|---|
| DE | 23 03 450 A1 | 8/1974 |

(Continued)

OTHER PUBLICATIONS

International Search Report in PCT/DE2017/100667, dated Jan. 23, 2018.

(Continued)

*Primary Examiner* — P. Macade Nichols
(74) *Attorney, Agent, or Firm* — Collard & Roe, P.C.

(57) ABSTRACT

A valve, a pump valve, and a pump including a pump valve has a valve housing in which a valve seat and a closing body that is movable in the axial direction, relative to the valve seat, are provided. The closing body is radially connected to the valve housing via at least one element made of flexible material and is radially connected to the valve housing at least at two axially mutually spaced clamping points by at least one element made of flexible material, in each case.

7 Claims, 6 Drawing Sheets

(51) Int. Cl.
*F16K 15/06* (2006.01)
*F16K 15/00* (2006.01)

(52) U.S. Cl.
CPC .......... *F04B 53/1027* (2013.01); *F16K 15/00* (2013.01); *F16K 15/06* (2013.01)

(58) Field of Classification Search
USPC ........................................................ 137/529
See application file for complete search history.

(56) References Cited

FOREIGN PATENT DOCUMENTS

| | | |
|---|---|---|
| DE | 27 39 085 A1 | 3/1979 |
| DE | 10 2007 016736 A1 | 11/2007 |
| DE | 10 2007 016 898 A1 | 10/2008 |
| DE | 10 2015 200 937 A1 | 7/2016 |
| GB | 558 201 A | 12/1943 |
| GB | 2 003 586 A | 3/1979 |
| JP | H03-33571 A | 2/1991 |

OTHER PUBLICATIONS

English translation of the International Preliminary Report on Patentability in PCT/DE2017/100667, dated Feb. 14, 2019.

\* cited by examiner

VALVE, MORE PARTICULARLY A PUMP VALVE, FOR DELIVERING ABRASIVE AND/OR HETEROGENEOUS MIXTURES

CROSS REFERENCE TO RELATED APPLICATIONS

This application is the National Stage of PCT/DE2017/100667 filed on Aug. 7, 2017, which claims priority under 35 U.S.C. § 119 of German Application No. 10 2016 115 025.8 filed on Aug. 12, 2016, the disclosure of which is incorporated by reference. The international application under PCT article 21(2) was not published in English.

The present invention relates to a valve, a pump valve, and a pump comprising at least one pump valve.

A wide variety of automatic, pressure-controlled or fluid-controlled valves are used in various fields.

For example, DE 10 2007 016 898 A1, DE 10 2015 200 937 A1, GB 558 201 A, U.S. Pat. No. 2,355,862 A and JP H03-33571 A disclose valves comprising a sealing seat, a valve body that closes the sealing seat, and a resilient element which clamps the valve body radially against the sealing seat.

The most common field is process technology, and here in particular fluid valves in oscillating displacement pumps. As many years of experience shows, the weakness of valves of this kind is the closing procedure. If the closing body is intended to exactly fit the valve seat geometry, the closing body must be guided. However, this places high demands on the design, because the guide must be neither too tight nor too loose. If it is too tight, the valve jams, and if it is too loose problems are created upon closure.

These problems are:
1. The closing body first makes contact with one side, and is bent by the pressure already prevailing, the guide may be bent, and the valve rod (also referred to as the guide rod) breaks.
2. Proceeding from contact being made on one side, the closing body can also be pressed into a stable end position, and in the process cause frictional wear. This causes the valve to leak.
3. Again proceeding from contact being made on one side, the other side may be greatly accelerated and therefore strike and close the seat at a high closure energy.

Most valves used are subject to these problems, provided that they have to be guided and are of a particular size (e.g. >10 mm nominal width). However, the problem occurs in a more pronounced manner if it is necessary to pump heavy goods to be displaced. Thus, for example in the case of solid/liquid mixtures or multiphase mixtures up to dust, significant wear often results, which wear also affects the guidance and is thus damaging in two ways, specifically firstly that the guide slit widens, and secondly that the sealing region is eroded or treated in an extremely abrasive manner. This latter situation leads even to jet abrasion.

The guidance of closing bodies in valves is therefore a significant unresolved problem that results in significant costs, and often frequent failures, of valves, and thus pumps, in the pumping and processing industry.

U.S. Pat. No. 5,374,029 A discloses a solenoid through-flow valve, which comprises a valve body with a chamber arranged therein and first and second through-flow openings.

The object of the invention is therefore that of providing a valve, in particular a pump valve, and a pump comprising at least one pump valve, which do not exhibit the disadvantages set out above.

The object of the invention is achieved by a valve, comprising a valve housing in which a valve seat and a closing body that is movable in the axial direction, relative to the valve seat, are provided, wherein the closing body is radially connected to the valve housing by means of at least one element consisting of flexible material, in that the closing body is radially connected to the valve housing at at least two axially mutually spaced clamping points, by means of at least one element, consisting of flexible material, in each case, in that the closing body is radially connected to the valve housing at at least two axially mutually spaced clamping points, by means of at least one element, consisting of flexible material, in each case, in that the closing body consists of a cone, a plate, or a spherical segment, and a valve rod that is axially rigidly connected to the cone, the plate or the spherical segment, and in that one of the at least two axially mutually spaced clamping points is arranged axially above, and a further of the at least two axially mutually spaced clamping points is arranged axially below, the valve seat in the valve housing.

This embodiment of the invention provides a more compact valve geometry, and therefore smaller valve sizes and thus lower material costs.

According to the invention, the valve according to the invention can be used both for upflow operation and for downflow operation of a pump. The pump may be equipped with one or more valves, according to the requirements.

In downflow operation (a fluid is displaced from the top to the bottom), the closing body (for example of a suction and/or pressure valve) is arranged axially below the valve seat and is at the same time movable relative to the valve seat. Since the closing body is radially connected to the valve housing by means of at least one element consisting of a flexible material, the closing body can assume both an open position (closing body is arranged so as to be axially remote from the valve seat, as a result of which a fluid flow through the valve is achieved), and a closed position (closing body closes the valve housing, as a result of which a fluid flow is prevented).

In upflow operation (a fluid is displaced from the bottom to the top), the closing body is arranged axially above the valve seat and is at the same time movable relative to the valve seat. Since the closing body is radially connected to the valve housing by means of at least one element consisting of a flexible material, the closing body can assume both an open position (closing body is arranged so as to be axially remote from the valve seat, as a result of which a fluid flow through the valve is achieved), and a closed position (closing body closes the valve housing, as a result of which a fluid flow is prevented).

Fluids are any gases, vapors, dusts and liquids. The fluids may be aggressive, abrasive, toxic or a combination thereof.

The element consisting of resilient or flexible material is preferably an elongate element (longer than it is wide), comprising two end regions. The end regions may be designed as clamping regions, i.e. they can be clamped against the valve housing. Equally, the end regions may be connected to the valve housing by means of force-fitting connections. According to the invention, the closing body is in each case arranged centrally on the at least one element consisting of resilient or flexible material. In this case, the closing body is rigidly connected to the at least one element. The connection may be achieved for example by means of a force-fitting connection (screws, rivets, etc.). It is also conceivable for the closing body to comprise at least one through-hole, through which the elongate element is guided once or repeatedly and is thus connected in a form-fitting manner. The connection may also be form- and force-fitting. It is furthermore conceivable for the element to comprise a hole in which the closing body is introduced. In this case, too, the connection may be form- and force-fitting.

The embodiment according to which the closing body is radially connected to the valve housing at at least two axially mutually spaced clamping points, by means of at least one element, consisting of flexible material, in each case, results in the closing body being guided at two axially mutually spaced points. This embodiment is advantageous in particular in order to achieve more precise axial guidance.

The scope of the invention also provides for an insert, which permits a flow of fluid, to be arranged in the valve housing. The insert may be designed as a cylinder for example. The end regions of the at least one element consisting of resilient or flexible material may be clamped to an end region, using means on the insert, for example. Equally, the end regions may be connected by means of force-fitting connections and the insert.

The at least one element may be designed for example as a spoke, metal membrane or spring, in particular helical spring, leaf spring or segmented spring. The element may be of any desired cross section, but preferably such that it allows for optimized flow. It is furthermore advantageous for the membrane shape to be designed such that the characteristic curve for reducing the pressure loss in the open position can be adjusted. As a result of this embodiment, the opening process brings about little or no increase in pressure loss, which advantageously saves energy.

It is advantageous, within the context of the invention, for the closing body to be radially connected to the valve housing by means of at least two, preferably at least three, elements that consist of flexible material.

The elements consisting of resilient or flexible material are preferably elongate elements (longer than it is wide), comprising two end regions. The end regions may be designed as clamping regions, i.e. for example one end region thereof may be clamped by means on the valve housing, and the other end region thereof may be clamped by means on the closing body. Equally, the two end regions may be connected to the closing body and to the valve housing by means of force-fitting connections.

The at least two elements consisting of flexible material, which elements radially connect the closing body to the valve housing are designed so as to be able to guide the closing body along the axial axis. Preferably, one of the end regions of each of the at least two elements consisting of flexible or pliable material are in each case fastened to the closing body so as to be uniformly distributed over the periphery. The respective other end regions of the at least two elements consisting of flexible or pliable material are in each case radially fastened to the valve housing (or the insert).

Within the context of the invention, in the event that an insert is arranged in the valve housing, one end region of the element consisting of resilient or flexible material may for example be clamped using means on the insert, and the other end region may be clamped using means on the closing body. Equally, the end regions may be connected, by means of force-fitting connections, to the closing body at one end region, and to the insert at the other end region.

In the event of the closing body being radially connected to the valve housing by means of precisely three elements consisting of flexible material, said elements are likewise uniformly distributed over the periphery of the valve housing, specifically at an angle of 120° relative to one another in each case.

In the event of the closing body being radially connected to the valve housing by means of precisely four elements consisting of flexible material, said elements are likewise uniformly distributed over the periphery of the valve housing, specifically at an angle of 90° relative to one another in each case.

In this context, rigidly connected means that the valve rod and the cone or the valve rod and the plate or the valve rod and the spherical segment are interconnected by means of integral bonding methods (e.g. welding, etc.), or by means of force-fitting methods (screwing, etc.). It is likewise conceivable for the valve rod and the cone or the valve rod and the plate or the valve rod and the spherical segment to be manufactured in one piece (by a casting process, by sintering, by GRP forming by 3D printing, etc.)

According to the invention, in the case of the embodiment in which the closing body is connected to the valve housing by means of at least two elements consisting of flexible material, the elements consisting of flexible material are arranged radially on the valve rod of the closing body and are radially connected to the valve housing.

Furthermore, the closing body is designed as a sphere.

In this embodiment, the sphere may comprise a through-hole at the relevant axially spaced clamping point, through which hole the relevant at least one element consisting of flexible material is guided. In this case, the sphere is rigidly connected to the element and is arranged centrally on the element consisting of flexible material.

It is conceivable for the element consisting of flexible material to comprise a region that corresponds to at least a partial outer contour of the sphere. The sphere can then be arranged in this region in a form-fitting manner, and be rigidly connected to the element by means of a force-fitting method. In this case, the region corresponding to at least a partial outer contour of the sphere is formed centrally on the element consisting of flexible material.

It is likewise conceivable for the sphere to be radially connected to the valve housing by means of at least two elements consisting of flexible material. In this embodiment, the elements consisting of flexible material may be connected radially on the sphere (at two horizontal circumferential points of the sphere diameter) and connected radially to the valve housing.

According to a further advantageous embodiment of the invention, the closing body is radially connected to the valve housing at at least two axially mutually spaced clamping points, in each case by means of at least two, preferably three, elements consisting of flexible material.

Furthermore, according to the invention, for the embodiment in which the closing body consists of a cone, a plate, or a spherical segment, and a valve rod that is axially rigidly connected to the cone, the plate or the spherical segment, the at least two axially mutually spaced clamping points are arranged axially above or axially below the valve seat in the valve housing.

The advantage of this embodiment is that the valve can be used for a flow both from bottom to top (upflow) and from top to bottom (downflow).

This embodiment also advantageously makes it possible to entirely omit metal guides. The metal guides are among the main wearing parts of a delivery valve. The useful lifetime of the valve can thus be increased.

This embodiment of the valve can also be used both for upflow operation and for downflow operation.

Within the context of the invention, the flexible material of the at least one element consists of a flexible material selected from the group consisting of metal sheets, elastomer moldings, elastomer sheet materials, plastomers and polytetrafluoroethylene (PTFE), and/or consists of a material that contracts upon energy being applied.

If the flexible material is formed as a material that contracts or expands upon energy being applied (in the sense of an artificial muscle), the valve can thus be closed and opened using electrical energy. The shape of the flexible material is adapted to the current technical possibilities for artificial muscles. The already known stack actuators are a first embodiment of this. However, others may also be used. The forms are in principle similar to the other embodiments in this description.

According to an embodiment of the invention, the flexible material is resilient.

Within the context of the invention, it is furthermore advantageous, in the case of the embodiment in which at least two elements consisting of flexible material are provided, for the elements consisting of flexible material to be manufactured in one piece.

For example, the elements could be arranged in the manner of spokes of a cartwheel, between an inner ring and the valve housing. The inner ring, which is connected to the closing body, then comprises one of the end regions of the elements, and the other end regions are connected to the insert or directly to the valve housing. The connections are either permanently rigid or are releasable.

The elements could, however, also be arranged in the manner of spokes of a cartwheel, between an inner ring and an outer ring. The inner ring, which is connected to the closing body, then comprises one of the end regions of the elements, and the other end regions are connected to the outer ring, wherein the outer ring is connected to the insert or directly to the valve housing. The connections are either permanently rigid or are releasable.

According to a further embodiment of the invention, the closing body and the at least one element consisting of flexible material are manufactured in one piece.

This embodiment is achieved for example by means of casting, injection molding, cutting, punching, sintering, GRP forming or printing (3D printing).

Furthermore, according to all the above embodiments, the valve housing, the optional insert, the valve seat and the closing body, comprising/not comprising a valve rod, are manufactured from materials resistant to hydro abrasion, selected from the groups of metals, elastomer moldings, elastomer sheet materials, plastomers and polytetrafluoroethylene (PTFE). In this case, according to the invention, the materials of the group of metals may undergo subsequent surface treatment. Know surface treatments can take place by means of coatings or heat treatment processes.

Within the context of the invention, the valve is a pump valve, in particular a pump valve for delivering abrasive and/or heterogenous mixtures.

The object is accordingly furthermore achieved by a pump that comprises a pump valve according to the invention, in particular a pump valve for delivering abrasive and/or heterogeneous mixtures.

The invention will be explained in greater detail in the following with reference to schematic drawings, specifically with reference to pumps and pump valves. It is explicitly noted that the pump valves shown are embodiments and the valves shown can also be used for any other applications. In the drawings.

In all the figures, the arrow indicates the pumping direction of the pumps comprising the valves according to the invention, wherein the valves can be used for a flow from bottom to top (upflow) and for a flow from top to bottom (downflow).

Figure 1:
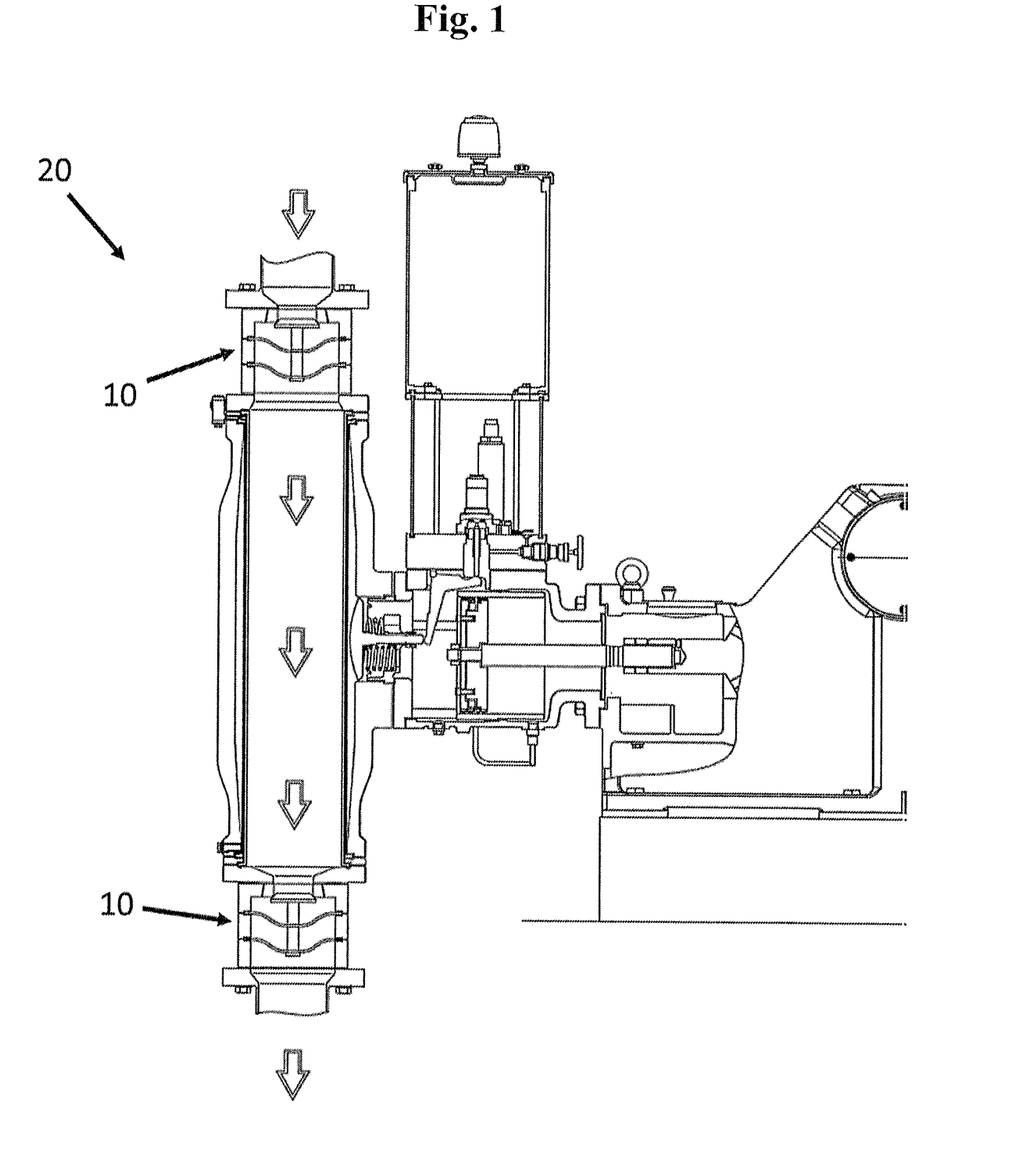
FIG. 1 shows a detail of a complete pump comprising a transmission comprising a valve according to the invention, according to FIGS. 2 to 3, installed therein, wherein the valve is a downflow pump valve.

FIG. 1 shows a complete pump (20) comprising a transmission and two downflow valves (10) according to the invention that are installed therein. The downflow valves (10) are downflow pump valves.

Figure 2:
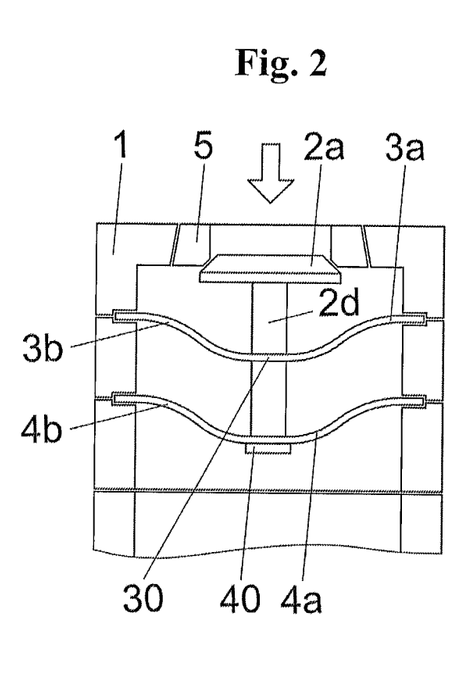
FIG. 2 shows a downflow pump valve in the closed state, wherein the closing body consists of a cone and a valve rod that is axially rigidly connected to the cone, wherein the closing body is radially connected to the valve housing at at least two axially mutually spaced clamping points that are arranged below the valve seat, in each case by means of at least two elements consisting of flexible material.
Figure 3:
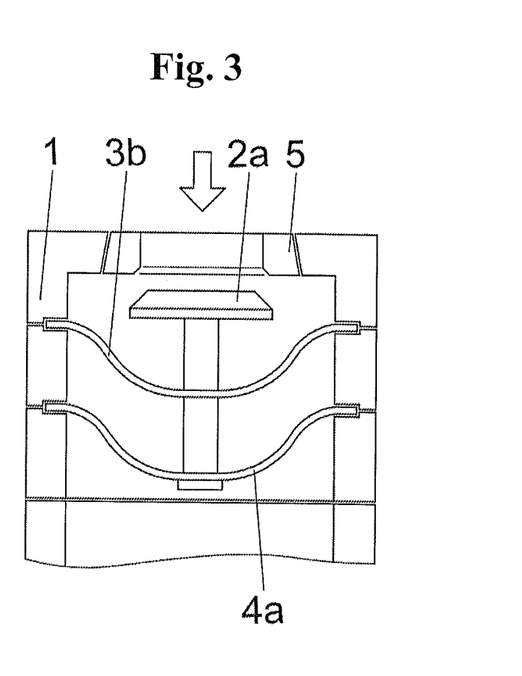
FIG. 3 shows a downflow pump valve in the open state, wherein the closing body consists of a cone and a valve rod that is axially rigidly connected to the cone, wherein the closing body is radially connected to the valve housing at at least two axially mutually spaced clamping points that are arranged below the valve seat, in each case by means of at least two elements consisting of flexible material.

The downflow pump valves according to the invention, in FIG. 1, are constructed as can be seen in FIGS. 2 and 3.

The valve (10) comprises a valve housing (1) in which a valve seat (5) and a closing body that is movable in the axial direction, relative to the valve seat (5), are provided. The closing body consists of a cone (2a) and a valve rod (2d) that is axially rigidly connected to the cone (2a). The closing body (2a, 2d) is radially connected to the valve housing (1) at at least two axially mutually spaced clamping points (30, 40), in each case by means of three elements (3a, 3b, 4a, 4b (3c and 4c not shown)) consisting of flexible material. The two axially mutually spaced clamping points (30, 40) are arranged axially below the valve seat (5) in the valve housing (1). FIG. 2 shows the valve in the closed position, and FIG. 3 in the open position.

Figure 4:
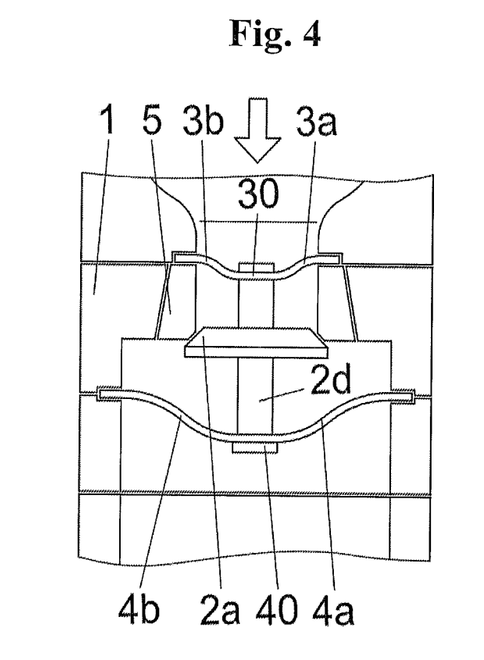
FIG. 4 shows a downflow pump valve in the closed state, wherein the closing body consists of a cone and a valve rod that is axially rigidly connected to the cone, wherein the closing body is radially connected to the valve housing at at least two axially mutually spaced clamping points, in each case by means of at least two elements consisting of flexible material, wherein one clamping point is arranged below, and one clamping point above, the valve seat.
Figure 5:
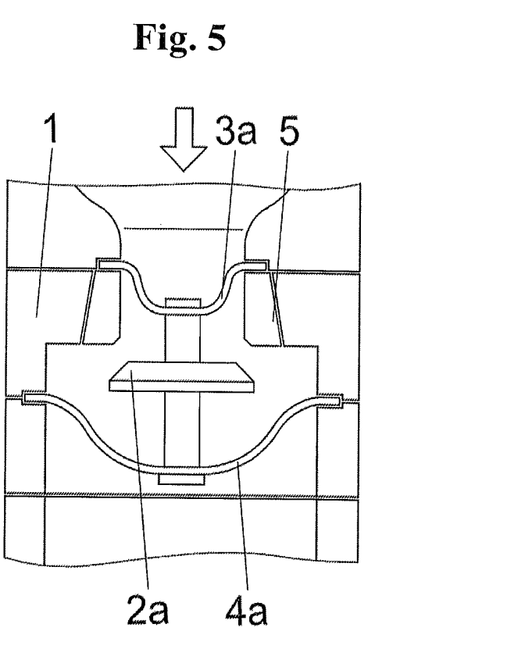
FIG. 5 shows a downflow pump valve in the open state, wherein the closing body consists of a cone and a valve rod that is axially rigidly connected to the cone, wherein the closing body is radially connected to the valve housing at at least two axially mutually spaced clamping points, in each case by means of at least two elements consisting of flexible material, wherein one clamping point is arranged below, and one clamping point above, the valve seat.

Another embodiment of downflow pump valves is constructed as can be seen in FIGS. 4 and 5.

The valve (10) comprises a valve housing (1) in which a valve seat (5) and a closing body that is movable in the axial direction, relative to the valve seat (5), are provided. The closing body consists of a cone (2a) and a valve rod (2d) that is axially rigidly connected to the cone (2a). The closing body (2a, 2d) is radially connected to the valve housing (1) at at least two axially mutually spaced clamping points (30, 40), in each case by means of three elements (3a, 3b, 4a, 4b (3c and 4c not shown)) consisting of flexible material. The two axially mutually spaced clamping points (30, 40) are arranged axially on the valve rod (2d) such that one of the clamping points (30) is radially connected to the valve housing (1) above the valve seat (5) and the other clamping point (40) is radially connected to the valve housing (1) below the valve seat (5). FIG. 4 shows the valve in the closed position, and FIG. 3 in the open position.

The pump valves according to the invention can also be used in upflow operation. Two different embodiments are set out in FIGS. 6 and 7 and in FIGS. 8 and 9.

Figure 6:
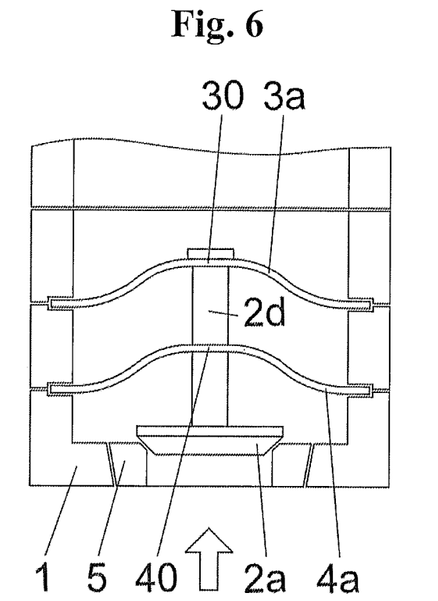
FIG. 6 shows an upflow pump valve in the closed state, wherein the closing body consists of a cone and a valve rod that is axially rigidly connected to the cone, wherein the closing body is radially connected to the valve housing at at least two axially mutually spaced clamping points that are arranged above the valve seat, in each case by means of at least two elements consisting of flexible material.
Figure 7:
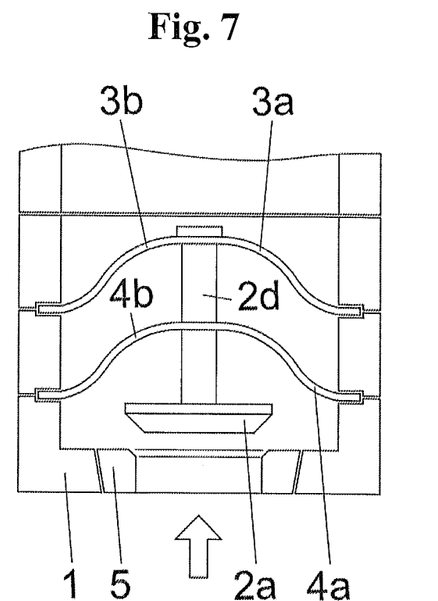
FIG. 7 shows an upflow pump valve in the open state, wherein the closing body consists of a cone and a valve rod that is axially rigidly connected to the cone, wherein the closing body is radially connected to the valve housing at at least two axially mutually spaced clamping points that are arranged above the valve seat, in each case by means of at least two elements consisting of flexible material.

An embodiment of upflow pump valves is constructed as can be seen in FIGS. 6 and 7.

The valve (10) comprises a valve housing (1) in which a valve seat (5) and a closing body that is movable in the axial direction, relative to the valve seat (5), are provided. The closing body consists of a plate (2a) and a valve rod (2d) that is axially rigidly connected to the plate (2a). The closing body (2a, 2d) is radially connected to the valve housing (1) at at least two axially mutually spaced clamping points (30, 40), in each case by means of three elements (3a, 3b, 4a, 4b (3c and 4c not shown)) consisting of flexible material. The two axially mutually spaced clamping points (30, 40) are arranged axially above the valve seat (5) in the valve housing (1). FIG. 6 shows the valve in the closed position, and FIG. 7 in the open position.

Figure 8:
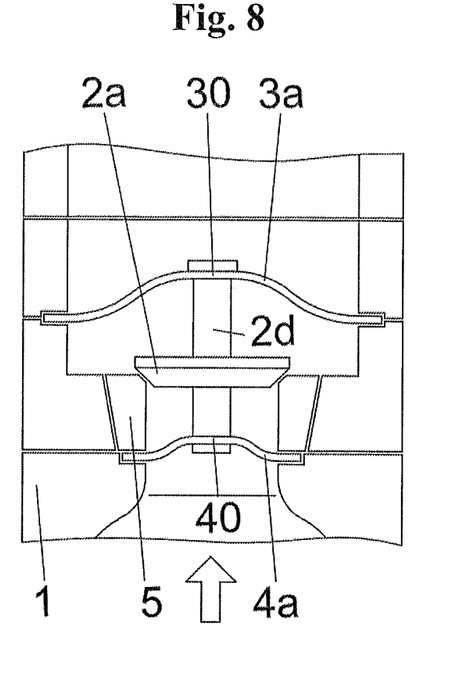
FIG. 8 shows an upflow pump valve in the closed state, wherein the closing body consists of a cone and a valve rod that is axially rigidly connected to the cone, wherein the closing body is radially connected to the valve housing at at least two axially mutually spaced clamping points, in each case by means of at least two elements consisting of flexible material, wherein one clamping point is arranged below, and one clamping point above, the valve seat.
Figure 9:
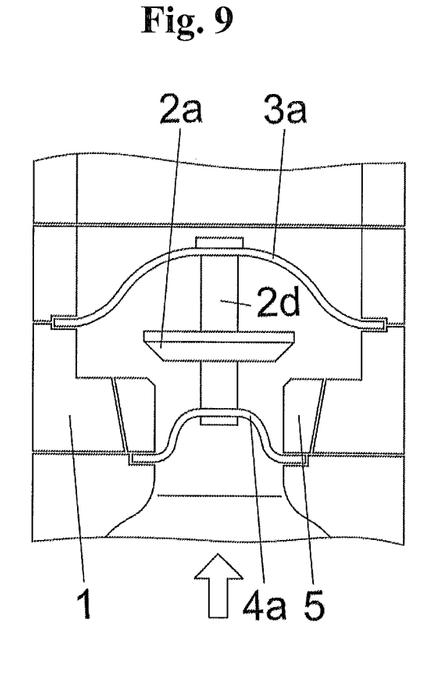
FIG. 9 shows an upflow pump valve in the open state, wherein the closing body consists of a cone and a valve rod that is axially rigidly connected to the cone, wherein the closing body is radially connected to the valve housing at at least two axially mutually spaced clamping points, in each case by means of at least two elements consisting of flexible material, wherein one clamping point is arranged below, and one clamping point above, the valve seat.

Another embodiment of upflow pump valves is constructed as can be seen in FIGS. 8 and 9.

The valve (10) comprises a valve housing (1) in which a valve seat (5) and a closing body that is movable in the axial direction, relative to the valve seat (5), are provided. The closing body consists of a plate (2a) and a valve rod (2d) that is axially rigidly connected to the plate (2a). The closing body (2a, 2d) is radially connected to the valve housing (1) at at least two axially mutually spaced clamping points (30, 40), in each case by means of three elements (3a, 3b, 4a, 4b (3c and 4c not shown)) consisting of flexible material. The two axially mutually spaced clamping points (30, 40) are arranged axially on the valve rod (2d) such that one of the clamping points (30) is radially connected to the valve housing (1) above the valve seat (5) and the other clamping point (40) is radially connected to the valve housing (1) below the valve seat (5). FIG. 8 shows the valve in the closed position, and FIG. 9 in the open position.

Figure 10:
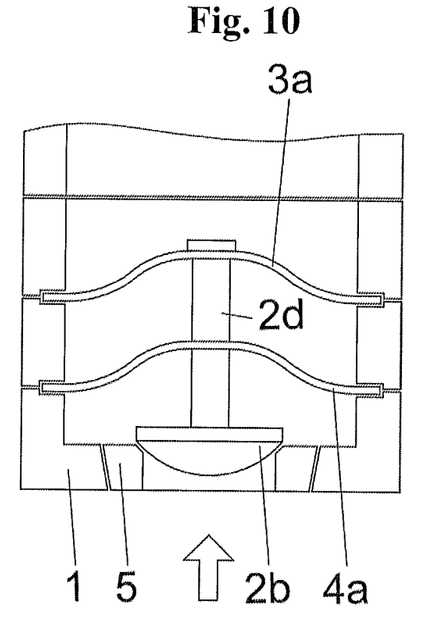
FIG. 10 shows an upflow pump valve in the closed state, wherein the closing body consists of a spherical segment and a valve rod that is axially rigidly connected to the spherical segment.

FIG. 10 shows a further upflow pump valve. The features of this valve correspond to those of the preceding embodiments, wherein the closing body consists, in this embodiment, of a spherical segment (2b) and a valve rod (2d) that is axially rigidly connected to the spherical segment (2b). It is also intended that the spherical segment can be replaced by a cone for example.

Figure 11:
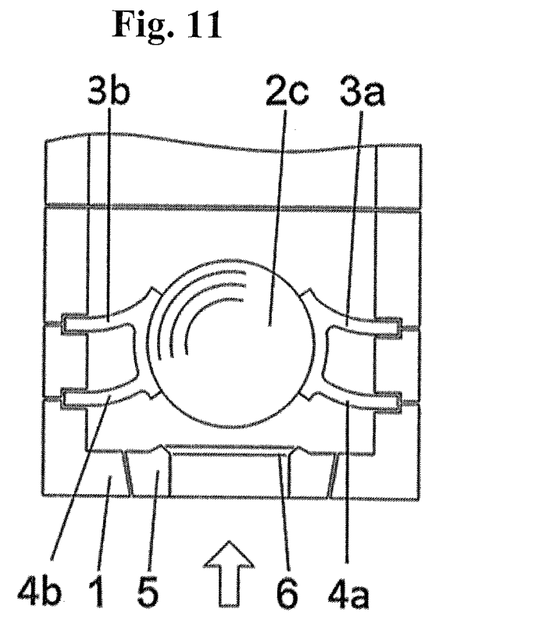
FIG. 11 shows an upflow pump valve in the open state, wherein the closing body is a sphere.

FIG. 11 shows a further upflow pump valve. The features of this valve correspond to those of the preceding embodiments, wherein the closing body in this embodiment is a sphere (2c). The closing body is radially connected to the valve housing (1) at two axially mutually spaced clamping points, in each case by means of three elements (3a, 3b (3c not shown), 4a, 4b (4c not shown)) consisting of flexible material. The elements (3a, 4a; 3b, 4b; 3c, 4c (not shown) consisting of flexible material are interconnected between the respective axially mutually spaced clamping points or are manufactured in one piece. The valve seat (5) comprises a centering aid (6).

Figure 12:
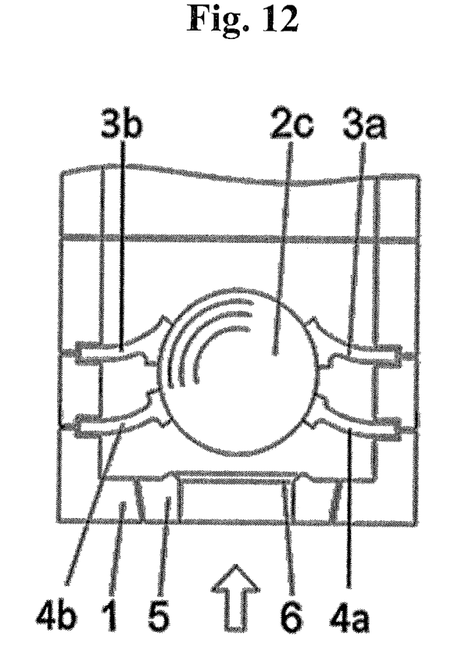
FIG. 12 shows a further upflow pump valve in the open state, wherein the closing body is a sphere.

FIG. 12 shows a further upflow pump valve. The features of this valve correspond to those of the preceding embodiments, wherein the closing body in this embodiment is a sphere (2c). The closing body is radially connected to the valve housing (1) at two axially mutually spaced clamping points, in each case by means of three elements (3a, 3b (3c not shown), 4a, 4b (4c not shown)) consisting of flexible material. The elements (3a, 3b; 4a, 4b; 3c, 4c (not shown) consisting of flexible material are not interconnected. The valve seat (5) comprises a centering aid (6).

Figure 13:
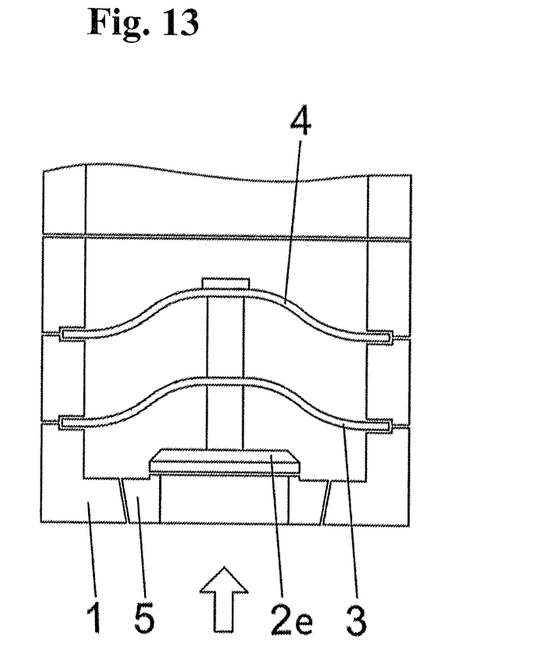
FIG. 13 shows an upflow pump valve in the closed state, wherein the closing body consists of a plate and a valve rod that is axially rigidly connected to the plate.

FIG. 13 shows an upflow pump valve in the closed state, wherein the closing body consists of a plate (2e) and a valve rod (2d) that is axially rigidly connected to the plate (2e). The features of this valve correspond to those of the preceding embodiments.

Figure 14:
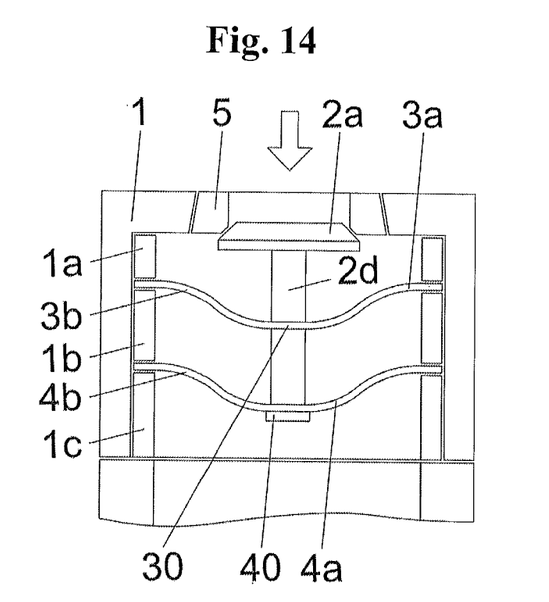
FIG. 14 shows a downflow pump valve in the closed state, wherein the closing body consists of a cone and a valve rod that is axially rigidly connected to the cone, wherein the closing body is radially connected, at at least two axially mutually spaced clamping points that are arranged below the valve seat, in each case by means of at least two elements consisting of flexible material, to an insert that is non-movably arranged in the valve housing.

FIG. 14 shows a valve according to the invention, shown here by way of example as a downflow pump valve, wherein a three-part insert (1a, 1b, 1c) is arranged in the valve housing (1). A valve seat (5) and a closing body that is movable in the axial direction, relative to the valve seat (5), are provided in the valve housing (1). The closing body consists of a cone (2a) and a valve rod (2d) that is axially rigidly connected to the cone (2a). The closing body (2a, 2d) is radially connected to the insert (1a, 1b, 1c) at at least two axially mutually spaced clamping points (30, 40), in each case by means of three elements (3a, 3b, 4a, 4b (3c and 4c not shown)) consisting of flexible material; in this case clamped or braced between the parts of the insert (1a, 1b; 1b, 1c). The valve housing (1) is smooth on the inner face, i.e. it does not comprise any means for clamping/bracing the elements consisting of flexible material. The insert (1a, 1b, 1c) is arranged in the valve housing (1) such that it is non-movable in the vertical direction. The two axially mutually spaced clamping points (30, 40) are arranged axially below the valve seat (5) in the valve housing (1). The valve is shown in the closed position.

Figure 15:
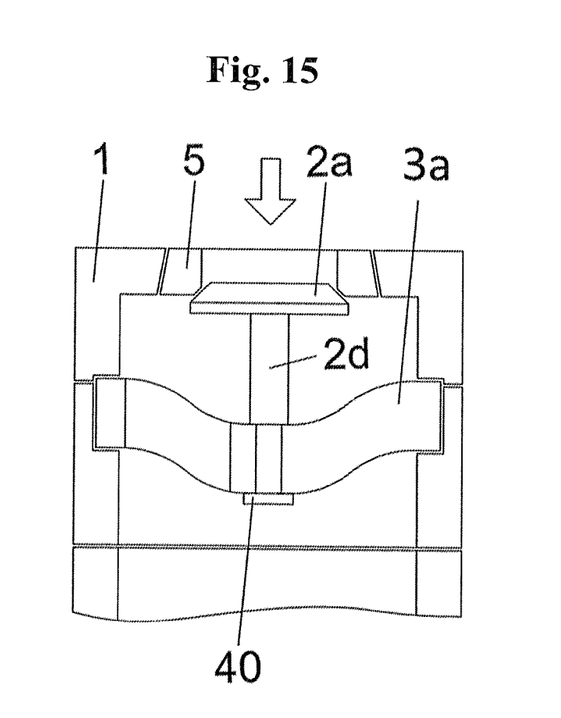
FIG. 15 shows a closing body that is connected to the valve housing by means of an element consisting of flexible material, wherein the two end regions of the element consisting of flexible material are connected to the valve housing.

FIG. 15 shows a valve comprising a valve housing (1) in which a valve seat (5) and a closing body (2a, 2d) that is movable in the axial direction, relative to the valve seat (5), are provided. The closing body consists of a cone (2a) and a valve rod (2d) that is axially rigidly connected to the cone (2a), and is radially connected, in this case clamped, to the valve housing (1) by means of an element (3a) consisting of flexible material. The closing body is rigidly connected to one element (3a) at the clamping point (40).

Figure 16:
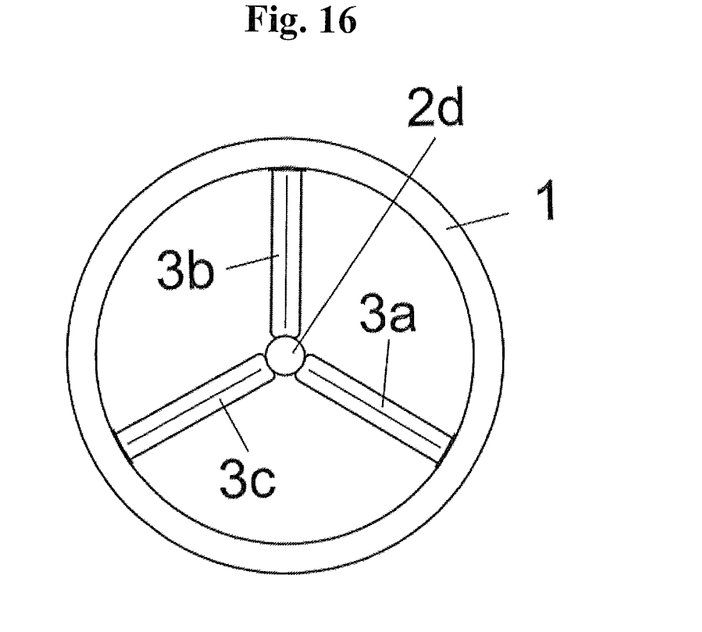
FIG. 16 is a plan view of the elements consisting of flexible material, wherein the elements radially connect the closing body to the valve housing.

FIG. 16 shows a possible connection between the closing body (in the case the valve rod 2d) and the valve housing (1), by means of three elements (3a, 3b, 3c) consisting of flexible material, which connection is applicable for all the above-mentioned embodiments. The elements (3a, 3b, 3c) are arranged in the manner of spokes of a cartwheel, between the closing body and the valve housing (1). One of the end regions of the elements is fastened or connected to the closing body, and the other end regions are fastened or connected to the valve housing or to the insert. The connections are either permanently rigid or are releasable.

Figure 17:
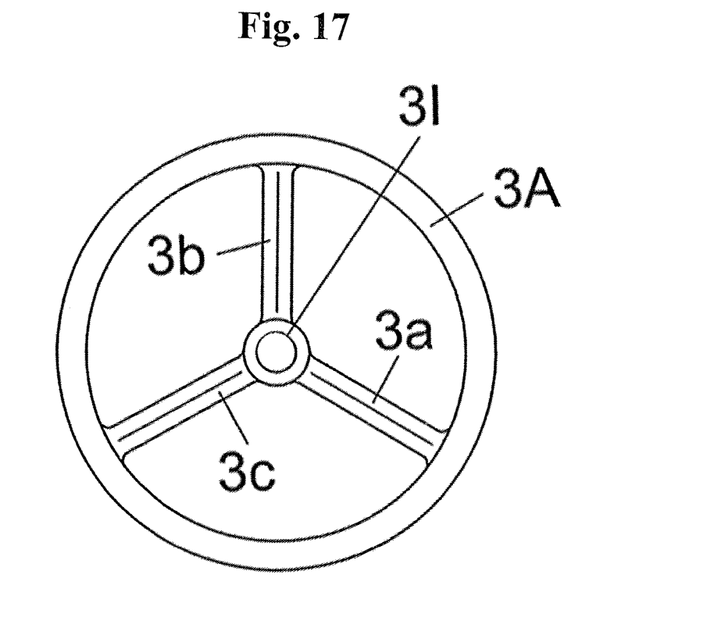
FIG. 17 is a plan view of the elements consisting of flexible material, wherein the elements are rigidly arranged between an inner ring and an outer ring and, as a whole (elements, inner ring, outer ring), radially connect the closing body to the valve housing.

FIG. 17 shows a further possible connection between the closing body and the valve housing (1), which connection is applicable for all the above-mentioned embodiments. The elements (3a, 3b, 3c) are arranged in the manner of spokes of a cartwheel, between an inner ring (3I) and an outer ring (3A). The inner ring (3I) is fastened to the closing body, and the outer ring (3A) is fastened to the valve housing or the insert. The connections are either permanently rigid or are releasable. The elements (3a, 3b, 3c), the inner ring (3I) and the outer ring (3A) may be formed or manufactured in one piece or in multiple parts. The outer ring (3A) may furthermore have a sealing function.

The invention claimed is:

1. A valve (10), comprising a valve housing (1) in which a valve seat (5) and a closing body (2) that is movable in the axial direction, relative to the valve seat (5), are provided,
    wherein the closing body (2) comprises a cone, a plate or a spherical segment, and a valve rod that is axially rigidly connected to the cone, the plate or the spherical segment, and
    wherein the closing body (2; 2c; 2a, 2d; 2b, 2d; 2e, 2d) is radially connected at at least two axially mutually spaced clamping points (30, 40) to the valve housing (1), by means of at least two elongate elements (3a; 3a, 3b; 3a, 3b, 3c; 4a, 4b; 4a, 4b, 4c), comprising flexible material, in each case, and comprising two end regions which are designed as clamping regions, and
    wherein one of the at least two axially mutually spaced clamping points (30) is arranged axially above, and a further of the at least two axially mutually spaced clamping points (40) is arranged axially below, the valve seat (5) in the valve housing (1).

2. The valve (10) according to claim 1, wherein the closing body (2) is radially connected to the valve housing (1) by means of at least three elongate elements (3a, 3b, 3c) that comprise flexible material.

3. The valve (10) according to claim 2, wherein the at least two elongate elements (3a, 3b; 3a, 3b, 3c; 4a, 4b; 4a, 4b, 4c) comprising flexible material are manufactured in one piece.

4. The valve (10) according to claim 1, wherein the flexible material is selected from the group consisting of metal sheets, elastomer moldings, elastomer sheet materials, plastomers and polytetrafluoroethylene (PTFE), and/or comprises a material that contracts or expands upon energy being applied.

5. The valve (10) according to claim 1, wherein the closing body (2) and the at least two elongate elements (3a; 3a, 3b; 3a, 3b, 3c; 3a, 3b, 4a, 4b; 3a, 3b, 3c, 4a, 4b, 4c) comprising flexible material are manufactured in one piece.

6. The valve (10) according to claim 1, wherein the valve is a pump valve.

7. A pump (20) comprising the pump valve according to claim 6.

* * * * *